June 24, 1930. W. H. McBRIDE 1,767,387
EXPANDING FRICTION CLUTCH FOR MOTOR CARS
Filed April 6, 1928    2 Sheets-Sheet 1
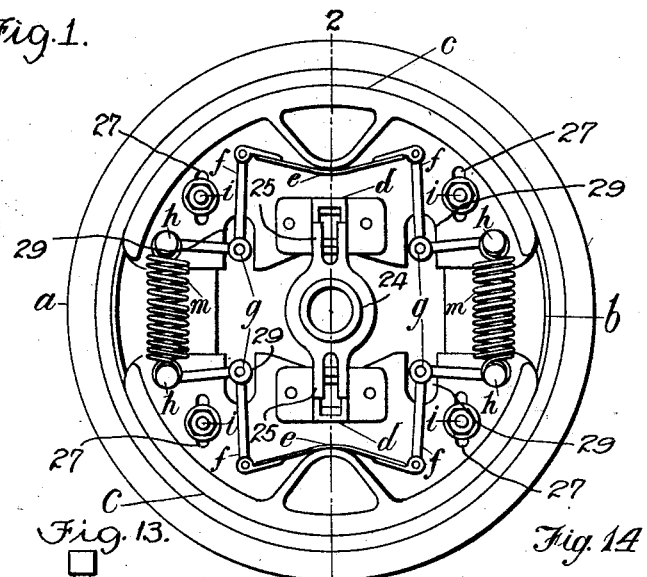
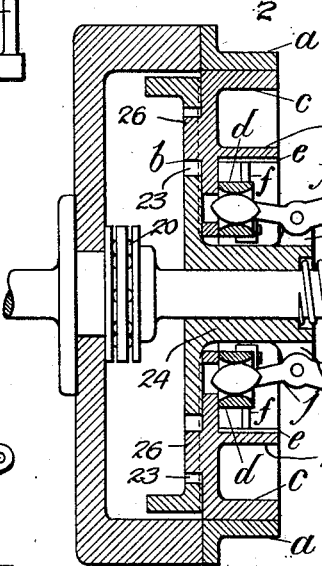
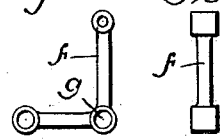
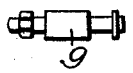
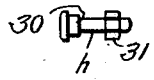
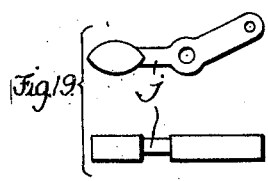
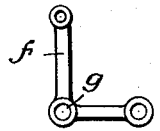
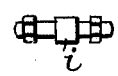
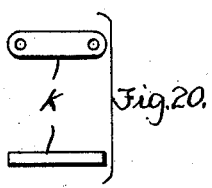
Inventor
W. H. McBride
By Lacey & Lacey,
Attorneys

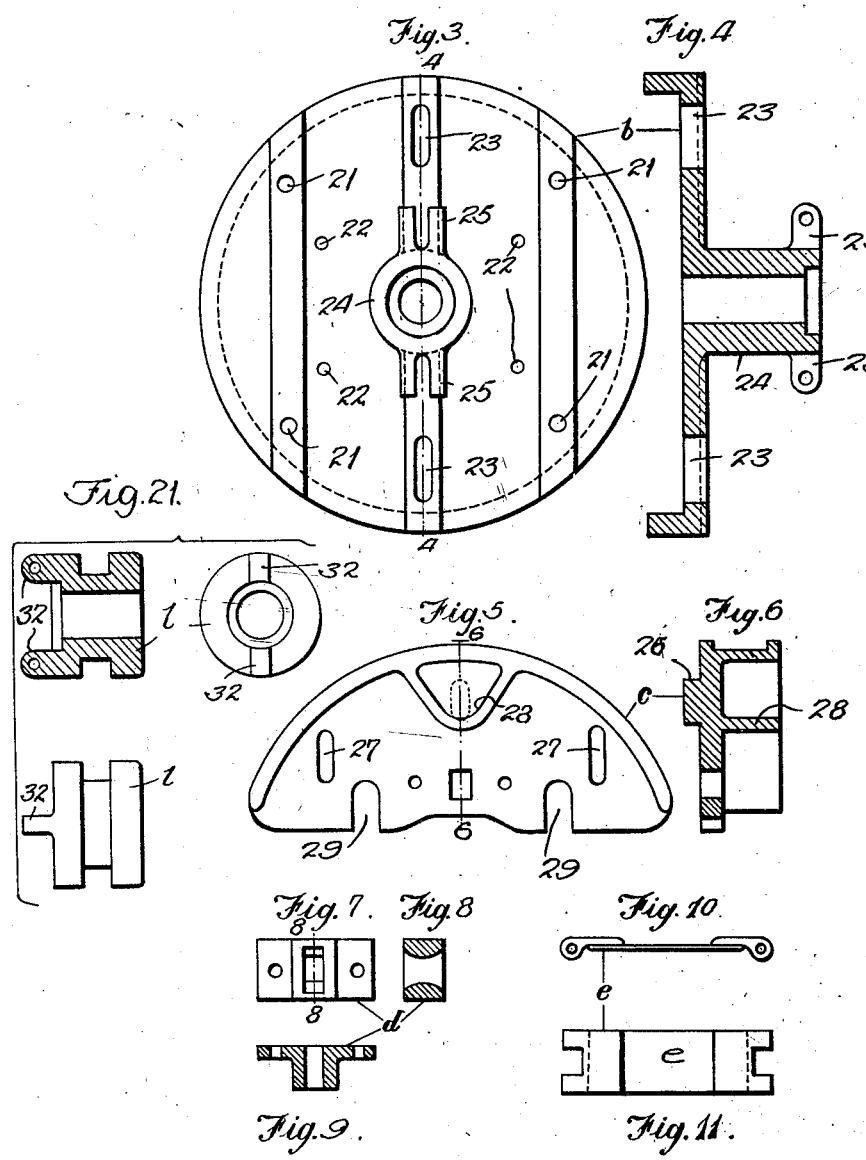

Patented June 24, 1930

1,767,387

UNITED STATES PATENT OFFICE

WILLIAM HILL McBRIDE, OF COATBRIDGE, SCOTLAND

EXPANDING FRICTION CLUTCH FOR MOTOR CARS

Application filed April 6, 1928, Serial No. 267,966, and in Great Britain April 23, 1927.

This invention relates to an improved expanding friction clutch for motor cars and the like.

The invention has for its object to provide a clutch of improved and simplified construction which as will be hereinafter seen is admirably suited to cope with traffic, and with crowded thoroughfares. It engages easily without jump, or jolt, whilst the least movement of the clutch pedal will disengage the friction segments. With this clutch starting, or stopping, or gliding along slowly in the wake of traffic becomes a matter of easy manipulation.

In construction it is a simple clutch, and the replacing of any part is easily effected. By carrying spare parts which might be required—such as balance springs and tensile springs—clutch trouble may be put right on the road in a short time, instead of becoming a garage job of days' duration.

My improved expanding friction clutch consists of two segments, feathered and fitted into slots on a driving disc to which the segments are attached by four guide bolts, the feathers of the segments being so fitted and the nuts of the guide-bolts so adjusted that the friction flanges of the segments expand easily to the friction ring on the flywheel. The two segments are simultaneously expanded by the use of four bell-crank levers, two balance springs and two tensile spiral springs. Each of the segments is provided with a seating or bearing against which the balance springs work, and a toggle bracket fixed rigidly in position. The segments are contracted by means of toggles working in the toggle brackets on the segments having their fulcra in lugs on the hub of the driving disc, the expanding arms of the toggle levers being attached by four links—two on each side—to a sliding sleeve with an expanding spiral spring on the driven shaft between the driving disc hub and the sliding sleeve.

In order that my said invention may be clearly understood it is hereinafter described with reference to the accompanying drawings in which:—

Figure 1 is an elevation which shows fully the construction of my improved expanding friction clutch for motor cars and the like;

Figure 2 is a section on the line 2—2 of Fig. 1;

Figure 3 is an elevation of the driving disc for the clutch;

Figure 4 is a sectional view taken on the line 4—4 of Figure 3;

Figure 5 is a view of one of the two expanding segments;

Figure 6 is a section on the line 6—6 of Figure 5;

Figure 7 is an elevation of a toggle bracket;

Figure 8 is a section taken on the line 8—8 of Fig. 7;

Figure 9 is a longitudinal section of a toggle bracket;

Figure 10 is a side view of one of two balance springs for expanding the segments;

Figure 11 is a plan of said balance spring to connect with joints to bell-crank top and bottom arms;

Figures 12, 13 and Figures 14, 15 show two sets of bell-cranks for connecting said expanding segments to said springs;

Figure 16 shows a turned stud which is fitted into the driving disc to carry the bell-cranks;

Figure 17 shows a pin for fixing the tensile spiral springs to the side arms of the bell-crank levers;

Figure 18 shows a turned guide pin for fixing the expanding segments to the driving disc;

Figure 19 shows a toggle lever to fit into the toggle brackets on the expanding segments;

Figure 20 shows a link for connecting the sliding sleeve to the toggle crank levers;

Figure 21 shows in longitudinal section, plan and end view a sliding sleeve with lugs for connecting to toggle links.

The organization of my improved expanding friction clutch for motor cars and the like will be easily understood from a study of the accompanying drawings.

If my clutch is applied to a car using the existing flywheel it will be necessary to have a friction ring $a$ rigidly fixed on the rim of the flywheel. In the case where a new flywheel is made to take the driving disc $b$, this can be done with very little alteration of the pattern.

In Figure 2 of the accompanying drawings there is shown a friction ring, $a$, rigidly fixed on an existing flywheel, and also my improved driving disc, $b$, fully mounted in position with a ball-thrust bearing 20 between the flywheel and the driving disc to take up the thrust from the flywheel. The driving disc is to be made as shown in Figures 3 and 4 of the accompanying drawings, with four holes 21 for guide-bolts of segments, four holes 22 for stud pins to carry the bell-cranks, two slots 23 to take the feathers of the segments, and with a hub 24 cast in the centre having lugs 25 to take the toggle levers.

Mounted on the driving disc are two segments $c$ lined on their rims with the material known under the registered trade-mark name "Ferodo." These segments are to be fitted on the disc in such-wise that the feathers 26 of the segments fit neatly into the slots of the disc, and work easily. The segments are to be held to the disc by four guide-pins $i$ which are fitted into the disc and pass through oblong slots 27 in the segments. The nuts of the guide bolts are to be so adjusted as to allow the segments to slide freely upon the face of the disk. A lug 28 is cast on the inner side of the friction flange of each segment and rests on the balance spring $e$ which connects the top and bottom arms of the bell-cranks $f$, which are fulcrumed at their angles on the disc, the segments having notches 29 in their chordal edges to clear the fulcrum pins or bolts, and the bell cranks lying in planes parallel with the plane of the segments.

The other arms of the bell-cranks are coupled together by the tensile spiral springs $m$, thus combining all the expanding elements into one great unit which gives an equal pressure all over the friction surface of the clutch. When the car is running centrifugal force comes in and controls the whole expanding arrangements of the clutch.

The expansion of the segments is operated from the tensile spiral springs $m$ which connect the side arms of the bell-cranks. The pull of said springs on the side arms of the bell cranks rocks the bell-crank levers so that the balance springs $e$ are tightened against the lugs 28 of the segments and the segments are caused to frictionally engage the ring $a$ on the flywheel.

It is to be noted that the balance springs $e$ are to be made from very flexible spring steel so that they can lend themselves readily to the deflection of the lugs 28 and the tension of the bell-crank arms.

To connect the tensile spiral springs $m$ to the bell-crank side arms four link pins $h$ are used. These link pins are each turned with a shoulder 30, and have a collar or nut 31 at the end to prevent the eye of the spring from slipping off. There is one of said link pins fitted into each of the side arms of the bell-cranks at the extreme ends. The bell-cranks themselves are fitted to the driving disc by turned studs $g$, and work freely in the slots or notches 29 at the bases of the segments. To retract the segments and so disengage the clutch the following device is used. There are two angled levers $j$, having forged ends which are fitted into the toggle brackets $d$, on the segments. The centres of these two angled levers are fitted into the lugs 25 on the hub of the driving disc and their outer arms are connected to the lugs 32 on the sliding sleeve $l$ by links $k$. On the driven shaft between the hub of the driving disc and the sliding sleeve there is an expanding spiral spring $n$, which brings back the clutch pedal to normal position when the foot pressure has been released. Just below the head of the sliding sleeve there is a groove turned to fit the swivel pads of a forked wiper in a well known manner.

What I claim is:—

1. A friction clutch comprising an outer ring, a rotatable disc, segments slidably mounted upon the face of the disc in position to engage the inner surface of the ring, angle levers fulcrumed upon the disc and arranged in pairs, one pair being disposed adjacent each segment, evener springs extending between the levers of each pair and engaging the respective segments whereby to hold them in frictional engagement with the ring, and tensile springs connecting the pairs of levers.

2. A friction clutch comprising an outer ring, a rotatable disk arranged concentric with the ring, segments slidably mounted on the face of the disc and provided with inwardly projecting lugs between their ends, angle levers fulcrumed upon the disc and arranged in pairs, one pair being disposed to cooperate with each segment, evener springs extending between and carried by the levers of each pair and bearing upon the respective lugs on the segments, and tensile springs connecting the pairs of levers.

In testimony whereof I have hereunto signed my name.

WILLIAM HILL McBRIDE.